Nov. 21, 1933.  J. F. CULLIN  1,935,789
BRUSH RIGGING FOR ELECTRICAL APPARATUS
Original Filed May 31, 1929
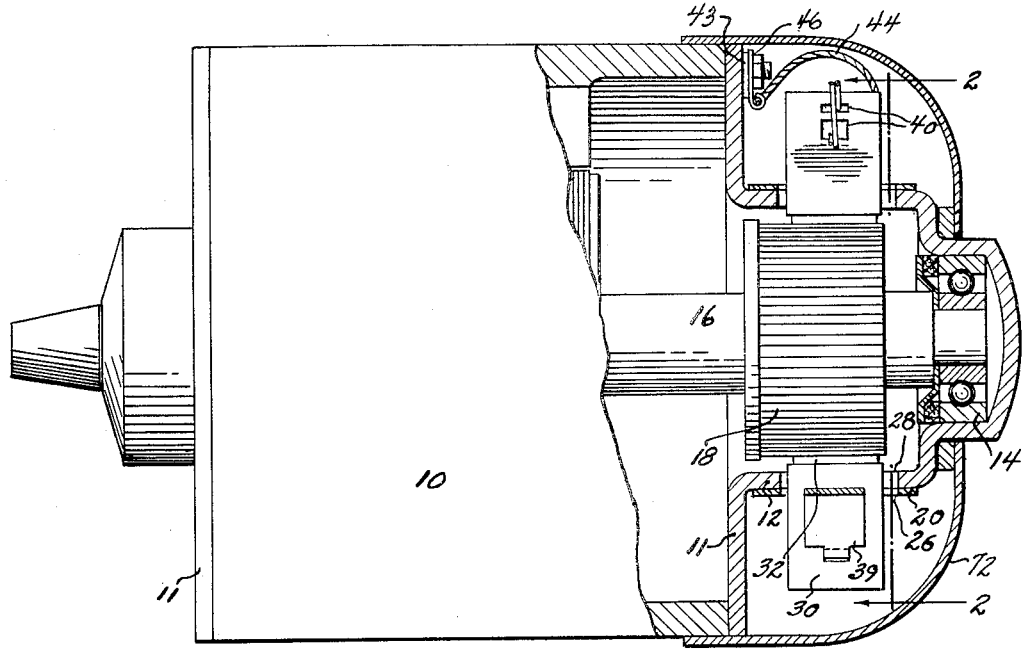
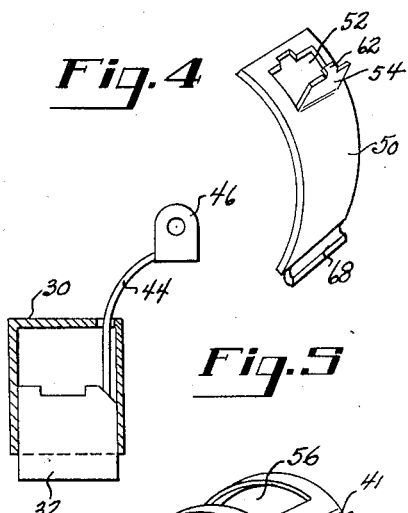
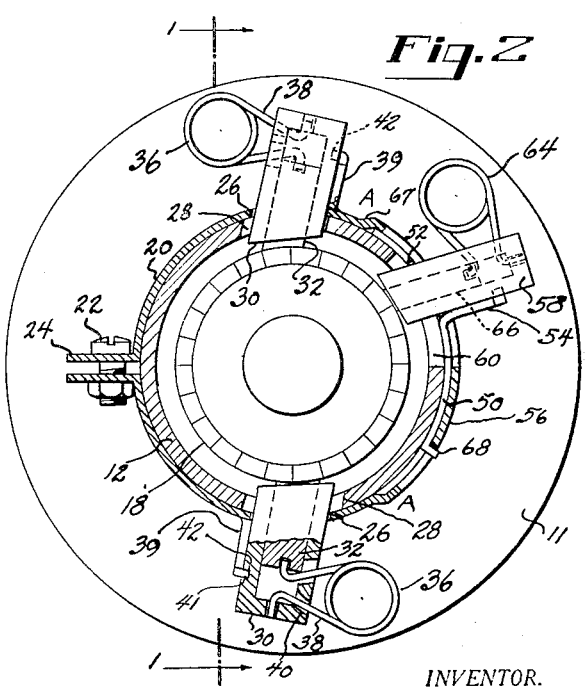
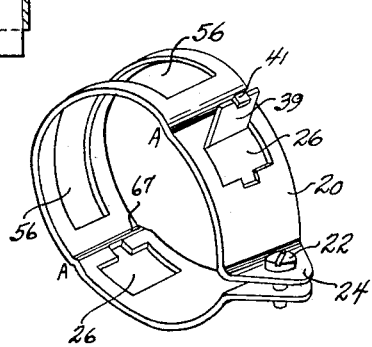
INVENTOR.
Jasper F. Cullin
BY Francis D. Hardesty
ATTORNEY.

Patented Nov. 21, 1933

1,935,789

UNITED STATES PATENT OFFICE 1,935,789

BRUSH RIGGING FOR ELECTRICAL APPARATUS

Jasper F. Cullin, Detroit, Mich., assignor, by mesne assignments, to Delco-Remy Corporation, Anderson, Ind., a corporation of Delaware Original application May 31, 1929, Serial No. 367,338. Divided and this application October 26, 1931. Serial No. 572,353

14 Claims. (Cl. 171—324)

This invention relates to electrical generators and more particularly to brush riggings for the same.

An object of this invention is a brush rigging which is entirely outside of the generator housing and which includes a ring surrounding a portion of the housing and having brush holders and brushes passing thru radial slots in the housing.

A further object is a brush rigging which is more economical of manufacture than riggings now in use and which at the same time is as efficient and accurate as those now in use.

A still further object is a brush rigging of the type disclosed in application Serial No. 367,338, filed May 31, 1929, of which this application is a division.

Still further objects will readily occur to those skilled in the art upon reference to the following description and the accompanying drawing in which Fig. 1 is a partial longitudinal section of a generator provided with a novel form of rigging and is taken on the line 1—1 of Fig. 2.

Fig. 2 is an end section of a generator, as if on the line 2—2 of Fig. 1, with parts removed for purposes of clarity.

Figs. 3 and 4 are perspective views of brush carrying parts.

Fig. 5 is a section view thru one of the brush holders.

As indicated on the drawing, the generator includes a housing having a cylindrical portion 10 and end plates 11 at least one of which has a cup shaped portion 12. Disposed within the housing and journalled in bearings 14 in the end plates is a rotor 16 whose commutator 18 is enclosed by the cup shaped portion 12 of the right hand end plate.

For use with the generator described in the foregoing, a novel form of brush rigging is provided, the same including a split ring 20 surrounding the cup shaped portion 12 being secured thereon by a screw 22 passing thru the ends 24 of the ring. The ring, though removable from and movable on the cup shaped portion, may be clamped or fixed in position thereon by the screw.

The ring is provided with slots 26 which may be aligned with slots 28 in the cup shaped portion 12 and thru these slots may be passed cup shaped brush holders 30 having brushes 32 slidably disposed therein, the brushes passing thru the slots 26 and 28 into engagement with the commutator 18.

Bowed springs 36, having legs 38 passing thru slots 40 in the holders and with their ends disposed within and engaging the ends of the holders and brushes, tend to urge the brushes out of the holders and into engagement with the commutator. The brush holders are held in place by tongues 39 formed from the ring, these having inwardly bent lugs 41 disposed within grooves 42 in the side walls of the holders. The brushes may be connected to binding posts 43 by pigtails 44 having terminals 46 on their ends.

For use with the rigging described in the foregoing an adjustably positioned brush is provided and this part, together with the means associated therewith for maintaining it in assembly will now be described.

An arcuate plate 50 is displaced between the ring 20 and the cup shaped portion 12, the ring being enlarged in diameter between the points A—A to accommodate this plate. The plate has a slot 52 and a tongue 54, the latter passing thru an elongated slot 56 of the ring 20. A brush holder 58 passes thru the slot 52 in the plate, thru the elongated slot 56 of the ring, and thru the elongated slot 60 of the cup shaped portion 12, the holder being maintained in assembled relation by the lug 62 of the plate tongue 54. A bow spring 64 may be used to force the brush 66 out of its holder 58 and into engagement with the commutator.

The plate 50 together with the holder 58 and the brush 66 may be moved as a unit around the commutator, the plate moving between the ring and the cup shaped portion. A stop for one end of the plate movement is formed near the point A by a shoulder 67 on the ring, and a stop for the other end of the movement may be provided by a lug 68 bent outwardly from the plate and passing thru the slot 56 of the ring.

A cover 72 may be provided to cover the brush rigging and may be removed when it is desired to expose the latter for manipulation.

It will be observed that all of the parts of the brush rigging are entirely outside of the housing and that all of them may be manipulated, removed or replaced without going inside the housing or without affecting the latter in any way.

It will further be observed that the entire brush rigging includes but a few parts, viz, the ring 20, the screw 22, the plate 50, the brush holders and brushes, etc.

Now having described the invention and the preferred embodiment thereof, it is to be understood that the said invention is to be limited, not to the specific details herein set forth, but only by the scope of the claims which follow.

What I claim is:

1. Electrical apparatus including a housing provided with end plates, one of which has a circumferentially slotted cup shaped portion, a rotor journalled in said end plates and having a commutator disposed within the cup shaped portion, and brush rigging comprising a slotted ring removably but fixedly mounted on and surrounding said cup shaped portion, angularly disposed brush holders removably but fixedly secured to said ring, and brushes disposed in said holders and passing thru slots in the ring and the cup shaped portion, into contact with the commutator.

2. Electrical apparatus including a housing provided with end plates, one of which has a circumferentially slotted cup shaped portion, a rotor journalled in said end plates and having a commutator disposed within the cup shaped portion, and brush rigging comprising a slotted ring removably but fixedly mounted on and surrounding said cup shaped portion, angularly disposed brush holders removably but fixedly secured to said ring, and brushes slidably disposed in said holders and passing thru the slots in the ring and the cup shaped portion, into contact with the commutator, the holders having springs for urging the brushes towards the commutator.

3. Electrical apparatus including a housing provided with end plates, one of which has a circumferentially slotted cup shaped portion, a rotor journalled in said end plates and having a commutator disposed within the cup shaped portion, and brush rigging comprising a slotted ring removably but fixedly mounted on and surrounding said cup shaped portion, angularly disposed brush holders removably but fixedly secured to said ring, and brushes disposed in said holders and passing thru the slots in the ring and the cup shaped portion, into contact with the commutator, the ring having tongues interlockingly engaging the holders for maintaining them in assembled relation.

4. Electrical apparatus including a housing provided with end plates, one of which has a circumferentially slotted cup shaped portion, a rotor journalled in said end plates and having a commutator disposed within the cup shaped portion, and brush rigging comprising a slotted ring removably but fixedly mounted on and surrounding said cup shaped portion, angularly disposed brush holders removably but fixedly secured to said ring, and brushes disposed in said holders and passing thru the slots in the ring and the cup shaped portion, into contact with the commutator, the rigging also including an adjustably positioned arcuate plate member slidably engaging the ring and being thereby maintained in assembled relation, and an additional brush holder held in assembled relation by the plate and having a brush passing thru slots in the ring and the cup shaped portion, into contact with the commutator.

5. Electrical apparatus including a housing provided with end plates, one of which has a circumferentially slotted cup shaped portion, a rotor journalled in said end plates and having a commutator disposed within the cup shaped portion, and brush rigging comprising a slotted ring removably but fixedly mounted on and surrounding said cup shaped portion, angularly disposed brush holders removably but fixedly secured to said ring, and brushes disposed in said holders and passing thru the slots in the ring and cup shaped portion, into contact with the commutator, the rigging also including an adjustably positioned arcuate plate member slidably engaging the ring and the cup shaped portion and being thereby maintained between them in assembled relation, and an additional brush holder held in assembled relation by a tongue formed from and projecting outwardly from the plate and thru the ring and having a brush passing thru slots in the ring and the cup shaped portion, into contact with the commutator.

6. In a brush rigging, a brush holder, a brush slidably disposed therein, and a bow spring having a helical loop therein outside of said holder and having bowed legs passing into the holder, between and engaging the end of the brush and the end of the holder, the bowed legs tending to separate and force the brush out of the holder.

7. In a brush rigging, a ring having slots and outwardly projecting tongues, brush holders angularly disposed in the slots and held therein by the tongues.

8. In a brush rigging, a ring having slots and outwardly projecting tongues, brush holders angularly disposed in the slots and held therein by the tongues, an arcuate plate within the ring and having a slot and a tongue passing thru the ring, and a brush holder angularly disposed in the plate slot and held therein by the plate tongue.

9. In a brush rigging, a ring having slots and outwardly projecting tongues, brush holders angularly disposed in the slots and held therein by the tongues, an arcuate plate within the ring and having a slot and a tongue passing thru the ring, and a brush holder angularly disposed in the plate slot and held therein by the plate tongue, the ring slot thru which the plate tongue passes being elongated so that the plate may be moved with respect to the ring.

10. In a brush rigging, the combination comprising, a ring having a slot therethrough, a cooperating arcuate plate slidable circumferentially with respect to said ring and having a slot therethrough, and a brush holder secured to said arcuate member and angularly disposed in said slots.

11. In a brush rigging, the combination comprising, a ring having slots therethrough, a cooperating arcuate plate slidable circumferentially with respect to said ring and having a slot therethrough, a brush holder secured to said arcuate member and angularly disposed in the slot in said arcuate member and one of the slots in said ring, and a second brush holder secured to said ring, and angularly disposed in another of the slots in said ring.

12. In electrical apparatus, the combination including a housing provided with end plates, one of which has a circumferentially slotted cup shaped portion, a rotor rotatably supported by said end plates and having a commutator disposed within the cup shaped portion, and a brush rigging comprising a slotted ring mounted on and surrounding said cup shaped portion, an angularly disposed brush holder supported by said ring, and a brush disposed in said holder and passing through the slots in the ring and the cup shaped portion, into contact with the commutator.

13. In electrical apparatus, the combination including a housing provided with end plates, one of which has a circumferentially slotted cup shaped portion, a rotor rotatably supported by said end plates and having a commutator disposed within the cup shaped portion, and a brush rigging including an arcuate member movably mounted on said cup shaped portion, means for fixedly holding said arcuate member in a given position, a brush holder mounted on said arcuate member, and a brush disposed in said holder and passing through the slot in the cup shaped portion, into contact with the commutator.

14. Electrical apparatus including a housing provided with end plates, one of which has a circumferentially slotted cup-shaped portion, a rotor rotatably supported by said end plates and having a commutator disposed within the cup shaped portion, and a brush rigging comprising in combination, a ring mounted on said cup shaped portion, an angularly disposed brush holder mounted on said ring, and a brush disposed in said holder and passing through the slot in said cup shaped portion, into contact with the commutator, the rigging also including an adjustably positioned arcuate member slidably engaging said cup shaped portion and held in a given position by said ring, an additional brush holder mounted on said arcuate member, and a brush disposed in said additional holder and passing through another slot in said cup shaped portion, into contact with said commutator.

JASPER F. CULLIN.